3,082,061
PRODUCTION OF POTASSIUM FLUOSILICATE
Raymond L. Barry, Lakeland, and Woodrow W. Richardson, Auburndale, Fla., assignors to International Minerals & Chemical Corporation, a corporation of New York
No Drawing. Filed Sept. 19, 1960, Ser. No. 56,688
4 Claims. (Cl. 23—88)

The present invention generally relates to the treatment of complex salts containing magnesium sulfate and potassium sulfate. More particularly the invention relates to a process for separately preparing potassium compounds and magnesium compounds from langbeinite, leonite, and/or schoenite.

Complex salts containing magnesium sulfate and potassium sulfate occur naturally in many potash ores, such as the potash ores that are found in the Permian Basin of the southwest area of the United States and mined chiefly in the Carlsbad district of New Mexico. It is frequently desirable to separately recover the potassium values and/or magnesium values from these complex salts and many processes to effect the separation have been developed.

Heretofore, the potassium values in langbeinite ore have been recovered by reacting langbeinite with an aqueous solution of potassium chloride to produce potassium sulfate. The potassium sulfate was crystallized from the solution and recovered, for example, by filtration. The potassium sulfate mother liquor could then be processed by one or another procedure to recover the magnesium values therefrom. This process for recovering potassium values from langbeinite, however, requires a high purity potassium chloride.

It is an object of the present invention to provide a new method for the separation of the potassium values from the magnesium values in these complex salts.

It is a further object of the present invention to provide a method for the preparation of potassium fluosilicate from complex salts containing magnesium sulfate and potassium sulfate.

It is another object of the present invention to provide a method for the preparation of potassium fluosilicate and magnesium sulfate from complex salts containing magnesium sulfate and potassium sulfate and fluosilicic acid.

These and other objects and advantages of the present invention will be apparent to those skilled in the art as the description of the present invention progresses.

Generally described, the present invention is a method which comprises reacting a complex salt containing magnesium sulfate and potassium sulfate with fluosilicic acid to form potassium fluosilicate, and separating solid potassium fluosilicate from the resulting solution.

As hereinbefore set forth, complex salts containing magnesium sulfate and potassium sulfate occur naturally in many potash ores. Examples of complex salts contemplated as starting materials in the process of this invention are the sulfates of potash magnesia, specifically the double salts, langbeinite ($2MgSO_4 \cdot K_2SO_4$), leonite

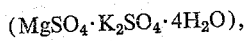

and schoenite

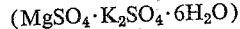

These complex salts may be utilized in pure or impure form, with the higher grades being preferred.

Since the reaction of these complex salts with the fluosilicic acid takes place in an aqueous medium, aqueous solutions of these salts may be used; however, solid salts, such as substantially dry complex salts, may also be admixed with the fluosilicic acid. Mixtures of two or more of the complex salts may also be used in the process of this invention. The use of the complex salts in solid form has certain advantages and is, therefore, preferred.

When the complex salts are used in aqueous solution, any suitable concentration may be used since the concentration is not a critical factor. It is, however, preferred to use concentrated solutions, which may be saturated solutions. The complex salts may contain water insoluble materials and these are preferably removed from the aqueous solutions of the complex salts prior to mixing with the fluosilicic acid. The water insoluble solids may be removed by any suitable method such as filtration, centrifugation, etc. When the complex salt containing magnesium sulfate and potassium sulfate is dissolved in water, the resultant aqueous solution contains magnesium ions, potassium ions and sulfate ions.

When the complex salts are used in solid form, they are preferably in subdivided form smaller than 20 mesh and more preferably smaller than 100 mesh. The solid complex salts may, of course, be slurried in water or other aqueous solution before admixing with the fluosilicic acid.

Fluosilicic acid from any suitable source may be used. As is well known, fluorine-containing gases are produced during the manufacture of fertilizers, phosphoric acid, phosphates and other phosphorus-containing materials from phosphorus-containing minerals such as fluorapatite and phosphate rock. These minerals contain fluorine as well as silica, iron, and other elements. When such minerals are chemically treated with an acid, such as phosphoric acid, sulfuric acid, nitric acid, hydrochloric acid, or mixtures of two or more of these acids, which type of treatment is relatively common in preparing more useful materials from these minerals, silicon tetrafluoride is liberated. Silicon tetrafluoride is also liberated when wet process phosphoric acid prepared from phosphate rock or fluorapatite is concentrated by evaporation techniques. The liberated silicon tetrafluoride is usually recovered by absorption in water or other aqueous solution. When the silicon tetrafluoride is dissolved in water, fluosilicic acid, $H_2SiF_6$, is formed.

While the present invention finds particular utilization in preparing potassium fluosilicate from fluosilicic acid obtained by absorbing the gases evolved during an acid treatment of phosphate material in an aqueous medium, it is to be understood that aqueous fluosilicic acid solutions from other sources may be used in the process of this invention.

The concentration of the fluosilicic acid is not a critical factor and any suitable concentration may be used. It is preferred that from about 2% to about 30% by weight fluosilicic acid be used and more preferably from about 12% to about 30% by weight fluosilicic acid, since good results have been obtained when using acid of these concentrations.

The reaction between the fluosilicic acid and the complex salt containing magnesium sulfate and potassium sulfate takes place in aqueous solution at ambient conditions. In general, temperatures within the range of from about 60° F. to about 180° F. may be utilized; however, lower or higher temperatures may be used when desired.

The reaction of langbeinite with fluosilicic acid may be represented as follows:

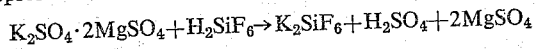

The reaction of leonite with fluosilicic acid may be represented as follows:

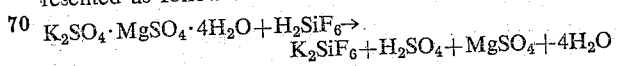

3,082,062
Patented Mar. 19, 1963

United States Patent Office

3,082,062
REMOVAL OF FERRIC CHLORIDE FROM IRON-ALUMINUM CHLORIDE SOLUTIONS
Albert F. Preuss, Jr., Hatboro, Pa., assignor to Rohm & Haas Company, Philadelphia, Pa., a corporation of Delaware
Filed Nov. 18, 1958, Ser. No. 774,694
26 Claims. (Cl. 23—92)

This invention relates to removal of ferric chloride from iron-aluminum chloride solutions and from iron-aluminum chloride solutions containing free hydrochloric acid. More particularly, it has reference to a process for extracting ferric iron from either of these solutions by using amines as liquid ion exchangers.

Currently, the invention has its major application in the aluminum processing industry. Aluminum-iron ore is leached to produce a solution containing ferric chloride and aluminum chloride. In the past, it has been extremely difficult and/or expensive to remove the ferric iron so that a high grade, iron-free alumina, can be obtained for feeding to the electrolytic cells for aluminum metal production.

Two methods have generally been in vogue for obtaining aluminum from its ores. In one, alumina is leached from its minerals by means of an alkali, and in the other, an acid leach is employed. The alkaline leach, which is utilized in accordance with a technique familiarly known to the art as the "Bayer" process, is generally limited in its application to low silica bauxite because the presence of silica causes an excessive loss of alumina and caustic soda. The acid leaching processes constitute an improvement over the alkaline leach method in that they need not be confined to low silica ores, as they are not affected very seriously by the presence of silica. However, this advantage over the alkaline leach procedure is offset by the fact that, whereas the alkaline method effects separation of iron from aluminum, such is not the case with an acid leach.

In view of the foregoing facts, plus the fact that a most important source for the production of alumina is from high silica aluminous ores, the acid leach route has been the one which certain segments of the industry prefer to employ. Until now, this method has been coupled with a method for separating ferric chloride from aqueous solutions of aluminum chloride along the lines of the procedure proposed by I. J. Klein in a doctoral dissertation published in 1942 by Columbia University and captioned "The Use of Organic Solvents in the Production of Alumina from High-Silica Aluminous Ores." Klein's method employs organic solvents, such as ethyl ether, isopropyl ether, n-butyl acetate, oxygen-containing compounds such as the higher alcohols, aldehydes, ketones, etc., to extract ferric chloride from an aqueous solution of chlorides.

The problem of removing ferric chloride from aqueous solutions containing aluminum chloride in an economically acceptable manner has heretofore been difficult enough, but the matter has been even more complicated when hydrochloric acid is present in the solution. For one thing, in some of the methods heretofore employed to remove ferric chloride from such solutions, the presence of HCl caused degradation of the extractant used to remove ferric chloride. There was the further problem caused by a considerable loss of the hydrochloric acid to the ferric chloride stream. That loss, in operations such as the production of alumina, may well constitute the difference between success and failure from an economical point of view.

The problem of iron removal from chloride-containing process streams is prevalent in many other commercial operations. In situations where the iron concentration is fairly low, and other conditions are right, ion-exchange resins may be used advantageously for this purpose. An example of this is the removal of ferric iron from concentrated hydrochloric acid disclosed in F. X. McGarvey's U.S. Patent 2,695,875. That process consists of treating concentrated hydrochloric acid containing trace amounts of ferric iron by passing the solution through a strongly basic, quaternary ammonium anion-exchange resin. The iron is removed as the $FeCl_4^-$ anionic complex, giving an effluent containing only about 0.5 p.p.m. Fe.

Certain important objections exist with respect to both of the above-described methods for removing ferric chloride from solutions additionally containing aluminum chloride, or from solutions containing aluminum chloride plus hydrochloric acid. For example, when using organic solvents such as ethers and acetates for extracting $FeCl_3$ from acid $AlCl_3$ solutions, both HCl and $FeCl_3$ are extracted in the organic phase. When the solvent is stripped from this phase by using water, most of the HCl in this phase is lost to the aqueous phase. By contrast, as will be illustrated later, the present invention makes it possible for the $FeCl_3$ to be separated out in the organic phase with no loss of the hydrochloric acid because all of it remains in the aqueous phase and is recovered along with the $AlCl_3$.

Another fault with the use of organic solvent extractants, such as the esters employed in the prior art, is that they hydrolyze under the conditions of the extraction. By contrast, the amines and amine-hydrochloride salts employed in the present invention are much more stable.

Still another important point of superiority of the present invention is that the solubility of the amines employed thereby, when in aqueous solution, is far less than the solubility of the ethers and acetates used in the past; this results in a loss of the extractant in the present invention which is far less than that of the prior art.

Comparable advantages of the present invention over previous methods using ion-exchange resins also exist. For example, by use of an amine as the extractant, it is possible to remove $FeCl_3$ as a concentrated solution devoid of any free HCl, a result which cannot be achieved with the resins. The use of amines does not involve any dilution of the original aluminum chloride in the leach liquor from which ferric chloride is being extracted. By contrast, in the employment of ion-exchange resins, there is considerable dilution because the resins need to be washed with water. In addition, the use of ion-exchange resins leads to a loss of some of the hydrochloric acid and a loss of some aluminum chloride; but no such loss is encountered in the present invention.

The manner in which the present invention functions may be expressed by the following general reactions (in which $R_1$, $R_2$, or $R_3$ must be an alkyl, alkenyl, aryl or an aralkyl group, and the remaining two "R's" must be either: (a) one of those same groups, or (b) a hydrogen atom):

In a similar way, various amines were tested for their ability to extract $FeCl_3$ from solutions additionally containing $AlCl_3$ and free HCl, the results being reported in Table II which follows. The first part, Table II–A, shows results obtained when various amine hydrochlorides were used; the second part, Table II–B, contains data obtained with some free amines. The concentration of the amine in each of these cases was 0.10 M; and, in each instance where alcohol was also used, the concentration thereof was 10 percent v./v. The equilibrium values were obtained by mixing the organic solutions with the aluminum-iron ore leach liquor (whose concentration was the same as that described above except for the addition of 10 g. HCl/l.) for 30 minutes, then allowing the phases to separate and analyzing the phase containing the lowest iron concentration. The iron concentration in the other phase was obtained by difference in some cases and by analysis in others. The iron was determined colorimetrically using $\alpha,\alpha'$-dipyridyl. As before, the different experiments in Table II represent extractions made at various phase ratios of the organic to the aqueous concentrations.

and cheaply from the amine which was used to extract it from the leach of other liquor. Although a number of stripping agents are available, since none is superior to water in this respect, and since water is obviously the most inexpensive and readily available, this is the preferred expedient. The stripping step takes place after the aqueous lower layer containing the aluminum chloride is drawn off, followed by the drawing off of the organic upper layer which contains the ferric chloride associated with the amine. It consists of adding a sufficient quantity of water (or other strippant) to the amine-ferric chloride solution, agitating this mixture and, after it settles into two phases, drawing off the ferric chloride which is then in the lower, aqueous phase. To illustrate the stripping equilibria for the removal of iron with water, a number of experiments were run with an extractant comprised of dodecenyl t-dodecyl amine, dissolved in kerosene and a mixture of lauryl and myristyl alcohols. The amine in each instance was loaded with iron by repeated contact with the $FeCl_3$—$AlCl_3$—HCl leach liquor. The results are shown in Table III. Similarly, as reported in Table

TABLE II–A

Extraction Equilibria Between $FeCl_3$—$AlCl_3$—HCl Liquor and Various Amine Hydrochlorides

| (1) | | (2) | | (3) | | (4) | | (5) | | (6) | | (7) | | (8) | | (9) | |
|---|---|---|---|---|---|---|---|---|---|---|---|---|---|---|---|---|---|
| Triisooctyl-amine (0.10 M) | | Dodecenyl t-dodecyl amine (0.10 M) | | Dodecenyl t-dodecyl amine (0.10 M) | | $C_{18-22}H_{37-45}NH_2$ (0.10 M) | | Dodecenyl t-dodecyl amine (0.10 M) | | t-Dodecyl-benzyl t-dodecyl-amine (0.10 M) | | $n$-$(C_8H_{17}$—$C_{10}H_{21})_3N$ (0.10 M) | | Didodecenyl n-butylamine (0.10 M) | | n-Dodecyl t-dodecyl amine (0.10 M) | |
| 10% v./v. decyl alcohol | | 10% tridecyl alcohol | | 10% v./v. decyl alcohol | | No alcohol | | 10% v./v. mixture of lauryl and myristyl alcohols | | 10% v./v. decyl alcohol | | 10% v./v. decyl alcohol | | 10% tridecyl alcohol | | 10% v./v. decyl alcohol | |
| C org. | C aq. | C org. | C aq. | C org. | C aq. | C org. | C aq. | C org. | C aq. | C org. | C aq. | C org. | C aq. | C org. | C aq. | C org. | C aq. |
| [1] 0 | [1] 2 | [2] 2.36 | [2] 0.85 | [1] 0.6 | [1] 0.5 | [2] 0.02 | [2] 9.74 | [1] 0.06 | [1] 0.01 | [1] 6 | [1] 1 | [2] 2.46 | [2] 0.22 | [2] 2.54 | [2] 0.08 | [1] 24 | [1] 0.4 |
| [1] 14 | [1] 2 | [2] 3.50 | [2] 3.30 | [1] 87 | [1] 1.6 | | | [1] 162 | [1] 0.1 | [1] 170 | [1] 14 | [2] 7.74 | [2] 2.33 | [2] 3.94 | [2] 2.38 | [1] 266 | [1] 48 |
| [2] 1.13 | [1] 10 | [2] 4.03 | [2] 6.28 | [2] 1.58 | [1] 175 | | | [2] 1.66 | [2] 1.243 | [2] 1.67 | [1] 355 | [2] 4.19 | [2] 5.87 | [2] 4.48 | [2] 5.78 | [2] 1.59 | [1] 580 |
| [2] 3.82 | [2] 2.27 | | | [2] 3.64 | [2] 2.97 | | | [2] 3.34 | [2] 3.56 | [2] 3.24 | [2] 3.45 | | | | | [2] 3.13 | [2] 3.76 |
| [2] 4.70 | [2] 5.61 | | | [2] 4.26 | [2] 6.04 | | | [2] 3.88 | [2] 6.37 | [2] 4.03 | [2] 6.28 | | | | | [2] 3.72 | [2] 6.58 |
| | | | | [2] 4.48 | [2] 8.74 | | | | | | | | | | | [2] 4.10 | [2] 9.45 |
| | | | | [2] 4.53 | [2] 9.07 | | | | | | | | | | | [2] 4.21 | [2] 9.92 |
| | | | | [2] 4.70 | [2] 9.39 | | | | | | | | | | | [2] 4.29 | [2] 10.13 |
| | | | | [2] 4.70 | [2] 9.45 | | | | | | | | | | | [2] 4.43 | [2] 10.34 |

[1] P.p.m.   [2] G./l.

TABLE II–B

Extraction Equilibria Between $FeCl_3$—$AlCl_3$—HCl Liquor and Various Free Amines

| Dodecenyl t-dodecyl amine (0.10 M) | | $n$=$(C_8H_{17}$—$C_{10}H_{21})_3N$ (0.10 M) | |
|---|---|---|---|
| 10% v./v. tridecyl alcohol | | 10% v./v. decyl alcohol | |
| C org., g./l. | C aq., g./l. | C org., g./l. | C aq., g./l. |
| 2.34 | 0.93 | 2.46 | 0.22 |
| 3.44 | 3.43 | 3.80 | 2.46 |
| 3.99 | 6.32 | 4.19 | 5.87 |

NOTE.—The values represented in Tables II–A and B above as p.p.m. or g./l. are for the amount of Fe††† present in the organic or aqueous phase respectively.

One of the outstanding advantages of the present invention is the fact that the iron may be stripped so readily IV, another set of experiments were run with the same amine extractant; but in this instance the amine was dissolved in kerosene and decyl alcohol.

TABLE III

Stripping Equilibria Between $FeCl_3$ and Dodecenyl t-Dodecylamine

Amine conc.: 0.10 M
Solvent: Kerosene and 10% v./v. of lauryl and myristyl alcohol mixture

| C/org., Fe, p.p.m. | C/aq. | | | | | |
|---|---|---|---|---|---|---|
| | Fe, g./l. | M/Cl- | M/HCl | Molar ratio, Cl/Fe | pH | Percent stripped |
| 1.0 | 4.59 | 0.258 | 0.009 | 3.10 | 1.68 | 99.98 |
| 4.3 | 9.28 | 0.517 | 0.012 | 3.07 | 1.50 | 99.92 |
| 5.5 | 13.49 | 0.740 | 0.009 | 3.04 | 1.36 | 99.88 |

TABLE IV

*Stripping Equilibria Between $FeCl_3$ and Dodecenyl t-Dodecylamine*

Amine conc.: 0.10 M
Solvent: Kerosene and 10% v./v. of decyl alcohol

| C/org., Fe, p.p.m. | C/aq. | | | | | |
|---|---|---|---|---|---|---|
| | Fe, g./l. | M/Cl⁻ | M/HCl | Molar ratio, Cl/Fe | pH | Percent stripped |
| 0.1 | 4.86 | 0.257 | −0.006 | 2.92 | 1.68 | 99.99 |
| 1.2 | 9.50 | 0.519 | 0.003 | 3.02 | 1.45 | 99.97 |
| 5.8 | 14.03 | 0.770 | 0.010 | 3.04 | 1.35 | 99.88 |

The data in the foregoing tables are indicative of the practicality of the present invention in commercial operations. The solubility losses of the amines in aqueous hydrochloric acid solutions are extremely low and well within commercially acceptable tolerances. The solubility loss of the alcohol from kerosene solutions is less than 20 p.p.m. and is also an acceptable figure in actual practice. Entrainment losses are extremely low, as in all cases the phases separated rapidly and clearly with no emulsion problems. The described process is capable of reducing the iron content of an $$FeCl_3—AlCl_3—HCl$$

liquor from 10 g. Fe/l. to 0.01 p.pm. Fe. The aluminum chloride solution obtained contains essentially only $AlCl_3$ and HCl. No appreciable reduction in aluminum chloride concentration or hydrochloric acid concentration was noted in the numerous tests which have been run, indicating essentially 100 percent recovery of aluminum chloride and hydrochloric acid.

As earlier stated, there is no upper limit to the amount of alcohol which is required in the novel process, but there is a critical lower limit which varies with the nature of the amine, the amount of the amine used, and the iron that is present. This limit can readily be determined by the very simple test of adding the extracting solution (alcohol-amine hydrochloride-kerosene) to the iron-aluminum chloride mixture to be treated and determining whether two phases or three phases are obtained. To illustrate this point, a number of tests were run which are reported in Table V below. In those tests, 25 ml. of solution containing 50 g. Fe/l. and 90 g. $Al_2O_3$/l. both metals present as their chlorides, was contacted with 25 ml. of a 0.10 molar solution of various amines-hydrochloride in kerosene. A third phase formed almost immediately upon mixing the two phases. The mixtures were then "titrated" with 0.10 molar amine-hydrochloride dissolved in kerosene with a final construction of 20 volume/volume percent alcohol. The end point was taken as the titer required for the disappearance of the third phase. The amines were essentially saturated wtih ferric chloride so that the values obtained corresponded to the minimum quantity of alcohol required to maintain an homogeneous organic phase for 0.10 molar amine. As will be seen from the data in Table V, the required minimum amount of alcohol varies with the different amines as well as with the different alcohols. Under these circumstances, it is best to determine the amount of alcohol needed by the simple test described above.

TABLE V

*Minimum Alcohol Required in Ferric Chloride Extractions*

Conditions: 0.1 M amine hydrochloride essentially saturated with $FeCl_3$

| Test No. | Amine | Vol./vol. percent alcohol | G. Fe⁺⁺⁺/l. organic |
|---|---|---|---|
| 1 | Dodecenyl t-dodecylamine. | 6.3% decyl alcohol | 5.30 |
| | Do | 5.9% tridecyl alcohol | 5.04 |
| | Do | 5.7% commercial mixture of myristyl and lauryl alcohols. | 4.86 |
| 2 | n-Dodecyl t-dodecylamine. | 4.8% decyl alcohol | 4.01 |
| | Do | 4.1% tridecyl alcohol | 4.48 |
| | Do | 3.5% commercial mixture of myristyl and lauryl alcohols. | 4.29 |
| 3 | t-Dodecylbenzyl t-dodecylamine. | 5.4% decyl alcohol | 4.77 |
| | Do | 5.2% tridecyl alcohol | 4.53 |
| | Do | 5.3% commercial mixture of myristyl and lauryl alcohols. | 4.77 |
| 4 | Triisooctylamine | 11.1% decyl alcohol | 5.15 |
| | Do | 9.6% tridecyl alcohol | 5.06 |
| | Do | 7.3% commercial mixture of myristyl and lauryl alcohols. | 4.96 |
| 5 | n-$(C_8H_{17}=C_{10}H_{21})_3N$ | 4.1% decyl alcohol | 5.44 |
| | Do | 5.7% tridecyl alcohol | 5.15 |
| | Do | 5.7% commercial mixture of myristyl and lauryl alcohols. | 4.86 |
| 6 | $C_{18-22}H_{37-45}NH_2$ | 0.00% decyl alcohol | 2.29 |
| | Do | 0.00% tridecyl alcohol | 2.29 |
| | Do | 0.00% commercial mixture of myristyl and lauryl alcohols. | 2.29 |
| 7 | Didodecenyl n-butylamine. | 5.7% decyl lacohol | 6.22 |
| | Do | 5.7% tridecyl alcohol | 6.53 |
| | Do | 4.8% commercial mixture of myristyl and lauryl alcohols. | 6.53 |

A particularly important advantage of the invention is its adaptability for a cyclical operation which is commercially practicable. Such a cyclical process is that represented in the drawings. As therein shown, the feed liquor, which optionally could be $FeCl_3$, $AlCl_3$ and HCl, or just $FeCl_3$ and $AlCl_3$, is fed to an extraction apparatus 1. This apparatus, which could be a single extractor or a plurality of such devices, operates on well-known counter-current principles for extraction. The $FeCl_3$ is thereby removed from the aqueous phase and transferred to the organic phase. The substantially iron-free aqueous liquor (with or without HCl as the case may be) containing the $AlCl_3$ is drawn off, and the organic phase, which contains the amine hydrochloride and $FeCl_3$, is directed to another extraction apparatus 2. Again by multiply counter-current operation, or even by a single stage, the $FeCl_3$ is stripped from the organic phase and removed as an aqueous liquor which is substantially free of excess HCl. The amine-hydrochloride, which is substantially free of iron, is then directed into the initial extractor 1 and the process is continuous from there on. If necessary, additional solvent for the amine is added at this point.

From the foregoing, it will be apparent that I have provided a new and improved process for extracting ferric iron from solutions of ferric chloride and aluminum chloride and from solutions containing $FeCl_3$—$AlCl_3$—HCl; and that my new process, in which amines are employed as liquid ion exchangers, has marked advantages over the organic solvent extractants and ion-exchange resins used in the prior art. The novel process has a broad range of application and can be varied by those skilled in the art without too great difficulty, yet without departing from the spirit and scope of my principal concept. Accordingly, I believe it proper that my invention be not necessarily limited by the specific examples and illustrations set forth above, but rather should be determined by the claims appended below.

I claim:

1. A process for the separation of ferric chloride from an aqueous solution containing ferric chloride and aluminum chloride, said process comprising intimately contacting the said solution of chlorides with an amine dissolved in at least one water-immiscible solvent therefor, in such amounts as to cause formation of a distinct aqueous phase containing the aluminum chloride and a distinct organic phase containing the ferric chloride associated with the amine, said amine having the formula $R_1R_2R_3N$ in which $R_1$ is a member of the class consisting of alkyl, alkenyl, aryl and aralkyl groups, $R_2$ is a member of the class consisting of H and the same groups represented by $R_1$, and $R_3$ is a member of the class consisting of H and the same groups represented by $R_1$, and said amine further being both substantially soluble in the organic phase and substantially insoluble in the aqueous phase.

2. The process of claim 1 in which the amine is a member of the class consisting of dodecenyl t-dodecylamine, n-dodecyl t-dodecylamine, triisooctylamine, t-dodecylbenzyl t-dodecylamine, didodecenyl n-butylamine, $C_{18-22}H_{37-45}NH_2$, and n-$(C_8H_{17}$—$C_{10}H_{21})_3N$.

3. The process of claim 1 in which the amine is in the hydrochloride form.

4. The process of claim 1 in which the amine is dissolved in at least two water-immiscible organic solvents therefor, one of which is a long-chained alcohol in amount sufficient to prevent the formation of a third phase.

5. The process of claim 4 in which the amine is a member of the class consisting of dodecenyl t-dodecylamine, n-dodecyl t-dodecylamine, triisooctylamine, t-dodecylbenzyl t-dodecylamine, didodecenyl n-butylamine, $C_{18-22}H_{37-45}NH_2$, and $(C_8H_{17}$—$C_{10}H_{21})_3N$, and the long-chained alcohol is a member of the class consisting of decyl alcohol, tridecyl alcohol, and a mixture of myristyl and lauryl alcohols.

6. The process of claim 4 in which the amine is in the hydrochloride form.

7. A process for the separation of $FeCl_3$ from an aqueous solution containing $FeCl_3$, $AlCl_3$ and HCl, said process comprising intimately contacting the said solution of chlorides with an amine dissolved in at least one water-immiscible solvent therefor in such amounts as to cause formation of a distinct aqueous phase containing the $AlCl_3$—HCl and a distinct organic phase containing the $FeCl_3$ associated with the amine, said amine having the formula $R_1R_2R_3N$ in which $R_1$ is a member of the class consisting of alkyl, alkenyl, aryl and aralkyl groups, $R_2$ is a member of the class consisting of H and the same groups represented by $R_1$, and $R_3$ is a member of the class consisting of H and the same groups represented by $R_1$, and said amine further being both substantially soluble in the organic phase and substantially insoluble in the aqueous phase.

8. The process of claim 7 in which the amine is a member of the class consisting of dodecenyl t-dodecylamine, n-dodecyl t-dodecylamine, triisooctylamine, t-dodecylbenzyl t-dodecylamine, didodecenyl n-butylamine, $C_{18-22}H_{37-45}NH_2$, and n-$(C_8H_{17}$—$C_{10}H_{21})_3N$.

9. The process of claim 7 in which the amine is in the hydrochloride form.

10. The process of claim 7 in which the amine is dissolved in at least two water-immiscible organic solvents therefor, one of which is a long-chained alcohol in amount sufficient to prevent the formation of a third phase.

11. The process of claim 10 in which the amine is a member of the class consisting of dodecenyl t-dodecylamine, n-dodecyl t-dodecylamine, triisooctylamine, t-dodecylbenzyl t-dodecylamine, didodecenyl n-butylamine, $C_{18-22}H_{37-45}NH_2$, and n-$(C_8H_{17}$—$C_{10}H_{21})_3N$, and the long-chained alcohol is a member of the class consisting of decyl alcohol, tridecyl alcohol, and a mixture of myristyl and lauryl alcohols.

12. The process of claim 10 in which the amine is in the hydrochloride form.

13. A process for the separation of ferric chloride from an aqueous solution containing ferric chloride and aluminum chloride, said process comprising intimately contacting the said solution of chlorides with an amine dissolved in at least one water-immiscible solvent therefor in such amounts as to cause formation of a distinct, lower, aqueous phase containing the aluminum chloride and a distinct, upper, organic phase containing the ferric chloride, said amine having the formula $R_1R_2R_3N$ in which $R_1$ is a member of the class consisting of alkyl, alkenyl, aryl and aralkyl groups, $R_2$ is a member of the class consisting of H and the same groups represented by $R_1$, and $R_3$ is a member of the class consisting of H and the same groups represented by $R_1$, and said amine further being both substantially soluble in the organic phase and substantially insoluble in the aqueous phase, drawing off and collecting the lower, aqueous phase, separately drawing off and collecting the upper, organic phase, adding a sufficient quantity of water to the separately collected organic phase so that upon shaking and settling same two new, distinct phases separate out, the lower being an aqueous phase that contains the ferric chloride and the upper being an organic phase that contain the amine substantially devoid of any ferric chloride associated therewith, and finally drawing off in separate steps the aqueous ferric chloride solution and the organic amine solution.

14. The process of claim 13 in which the amine is a member of the class consisting of dodecenyl t-dodecylamine, n-dodecyl t-dodecylamine, triisooctylamine, t-dodecylbenzyl t-dodecylamine, didodecenyl n-butylamine, $C_{18-22}H_{37-45}NH_2$, and n-$(C_8H_{17}$—$C_{10}H_{21})_3N$.

15. The process of claim 13 in which the amine is in the hydrochloride form.

16. The process of claim 13 in which the amine is dissolved in at least two water-immiscible solvents therefor, one of which is a long-chained alcohol in amount sufficient to prevent the formation of a third phase.

17. The process of claim 16 in which the amine is a member of the class consisting of dodecenyl t-dodecylamine, n-dodecyl t-dodecylamine, triisooctylamine, t-dodecylbenzyl t-dodecylamine, didodecenyl n-butylamine, $C_{18-22}H_{37-45}NH_2$, and n-$(C_8H_{17}$—$C_{10}H_{21})_3N$, and the long-chained alcohol is a member of the class consisting of decyl alcohol, tridecyl alcohol, and a mixture of myristyl and lauryl alcohols.

18. The process of claim 16 in which the amine is in the hydrochloride form.

19. A process for the separation of ferric chloride from aluminum chloride and hydrochloric acid out of an aqueous solution containing the three chlorides, said process comprising intimately contacting the said solution of chlorides with an amine dissolved in at least one water-immiscible organic solvent therefor in such amounts as to cause formation of a distinct, lower aqueous phase containing the aluminum chloride and hydrochloric acid, and a distinct, upper organic phase containing the ferric chloride, said amine having the formula $R_1R_2R_3N$ in which $R_1$ is a member of the class consisting of alkyl, alkenyl, aryl and aralkyl groups, $R_2$ is a member of the class consisting of H and the same groups represented by $R_1$, and $R_3$ is a member of the class consisting of H and the same groups represented by $R_1$, and said amine further being both substantially soluble in the organic phase and substantially insoluble in the aqueous phase, drawing off and collecting the lower aqueous phase, separately drawing off and collecting the upper, organic phase, adding a sufficient quantity of water to the separately collected organic phase so that upon shaking and settling same two new and distinct phases separate out, the lower being an aqueous phase that contains the ferric chloride and the upper being an organic phase that contains the amine substantially devoid of any ferric chloride associated therewith, and finally drawing off in separate steps the aqueous solution containing the ferric chloride and the organic solution containing the amine.

20. The process of claim 19 in which the amine is a member of the class consisting of dodecenyl t-dodecylamine, n-dodecyl t-dodecylamine, triisooctylamine, t-dodecylbenzyl t-dodecylamine, didodecenyl n-butylamine, $C_{18-22}H_{37-45}NH_2$, n-$(C_8H_{17}$—$C_{10}H_{21})_3N$.

21. The process of claim 19 in which the amine is in the hydrochloride form.

22. The process of claim 19 in which the amine is dissolved in at least two water-immiscible solvents therefor, one of which is a long-chained alcohol in amount sufficient to prevent the formation of a third phase.

23. The process of claim 22 in which the amine is a member of the class consisting of dodecenyl t-dodecylamine, n-dodecyl t-dodecylamine, triisooctylamine t-dodecylbenzyl t-dodecylamine, didodecenyl n-butylamine, $C_{18-22}H_{37-45}NH_2$, and n-$(C_8H_{17}$—$C_{10}H_{21})_3N$, and the long-chained alcohol is a member of the class consisting of decyl alcohol, tridecyl alcohol, and a mixture of myristyl and lauryl alcohol.

24. The process of claim 22 in which the amine is in the hydrochloride form.

25. A cyclic process for the separation of ferric chloride from an aqueous feed liquor containing ferric chloride and aluminum chloride, said process comprising directing the feed liquor into a first extraction means containing an amine dissolved in at least one water-immiscible organic solvent therefore in such amounts as to cause formation of a distinct aqueous phase containing the aluminum chloride and a distinct organic phase containing the ferric chloride, said amine having the formula $R_1R_2R_3N$ in which $R_1$ is a member of the class consisting of alkyl, alkenyl, aryl and aralkyl groups, $R_2$ is a member of the class consisting of H and the same groups represented by $R_1$, and $R_3$ is a member of the class consisting of H and the same groups represented by $R_1$, and said amine further being both substantially soluble in the organic phase and substantially insoluble in the aqueous phase, drawing off the substantially iron-free aqueous liquor containing the aluminum chloride, passing the organic phase containing the ferric chloride into a second extraction means where the ferric chloride is stripped from the organic phase, drawing off this ferric chloride solution, directing the organic phase containing the substantially iron-free amine from said second to said first extraction means, adding more of said organic solvent for the amine in said first extraction means, and continuing said process by introducing more of said feed liquor into said first extracton means.

26. The cyclic process of claim 25 applied to the separation of ferric chloride from aluminum chloride and hydrochloric acid out of an aqueous feed liquor containing those three chlorides.

References Cited in the file of this patent

UNITED STATES PATENTS

| | | |
|---|---|---|
| 1,870,214 | Aickelin et al. | Aug. 2, 1932 |
| 1,897,740 | Teller | Feb. 14, 1933 |
| 1,966,729 | Loomis et al. | July 17, 1934 |
| 2,249,761 | Hixson et al. | July 22, 1941 |
| 2,847,279 | Tucker | Aug. 12, 1958 |
| 2,909,542 | Soloway | Oct. 20, 1959 |

OTHER REFERENCES

Brown et al: U.S. Atomic Energy Commission Report AECD-4142, declassified Jan. 11, 1956, pages 1, 2, 24–39.